United States Patent
Schwartz et al.

[11] Patent Number: 6,091,531
[45] Date of Patent: Jul. 18, 2000

[54] DIFFERENTIAL CHARGE AND DUMP OPTOELECTRONIC RECEIVER

[75] Inventors: Daniel B. Schwartz, Apache Junction; Christopher K. Y. Chun; Stephen G. Shook, both of Gilbert, all of Ariz.

[73] Assignee: Motorola, Inc., Schaumburg, Ill.

[21] Appl. No.: 09/015,897

[22] Filed: Jan. 30, 1998

[51] Int. Cl.[7] .................................................. H04B 10/06
[52] U.S. Cl. ........................... 359/189; 327/514; 250/551
[58] Field of Search ..................................... 359/189, 194; 327/514, 326; 250/551

[56] References Cited

U.S. PATENT DOCUMENTS

| | | | |
|---|---|---|---|
| 5,448,076 | 9/1995 | Krause | 250/551 |
| 5,739,717 | 4/1998 | Nakamura | 327/514 |
| 5,798,520 | 8/1998 | Kuijk et al. | 250/214 |
| 5,949,567 | 9/1999 | Jebens | 359/189 |

*Primary Examiner*—Leslie Pascal
*Assistant Examiner*—Dalzid Singh
*Attorney, Agent, or Firm*—Eugene A. Parsons; William E. Koch

[57] ABSTRACT

A differential charge and dump optoelectronic receiver for baseband digital optoelectronic data links is disclosed having a preamplifier and a voltage controlled current source that defines the tail current of a differential pair functioning as a two quadrant multiplier, and using capacitors as loads on the differential pair making said differential pair an integrator. The integrator provides a full differential output, part of which is fedback to control the gain of the preamplifier. In a preferred embodiment, one integrator pair is used to recover the data from a Manchester encoded data stream. In another preferred embodiment, two pairs of integrators are used for QPSK like codes.

26 Claims, 2 Drawing Sheets

DIFFERENTIAL CHARGE AND DUMP OPTOELECTRONIC RECEIVER

FIELD OF THE INVENTION

The invention pertains to receiver architectures for baseband digital optoelectronic data links and more specifically to a differential charge and dump optoelectronic receiver for baseband digital optoelectronic data links.

BACKGROUND OF THE INVENTION

State of the art computer and communications systems require an efficient data transmission of high speed over short or longer distance. Optical data transmission is preferred in many cases where high speed data transfer and/or data transmission over longer distances are needed. more specifically, optoelectronic receivers for baseband digital optoelectronic data links are required in many applications where high speed optical data links are used.

Traditionally, the architecture of optoelectronic receivers is optimized for operation at a given bit rate and the bandwidth is hard wired. Further, prior art optoelectronic receiver architectures are single ended and do not use a differential architecture. Consequently, extrinsic and intrinsic noise may affect circuit operation and performance.

Accordingly, it would be highly desirable to provide new receiver architectures for base band digital optoelectronic data links which overcome these problems.

It is a purpose of the present invention to provide a new and improved architecture for a digital optoelectronic receiver.

It is another purpose of the present invention to provide a new and improved architecture for a digital optoelectronic receiver for base band digital optoelectronic data links.

It is still another purpose of the present invention to provide a new and improved architecture for a digital optoelectronic receiver where the bandwidth of said receiver is automatically optimized in spite of the bit rate of the signal being unknown.

It is yet another purpose of the present invention to provide a new and improved architecture for a digital optoelectronic receiver wherein said receiver uses the smallest possible bandwidth for whatever bit rate the circuit is operated at.

It is a further purpose of the present invention to provide a new and improved architecture for a digital optoelectronic receiver having an improved noise immunity.

It is still a further purpose of the present invention to provide a new and improved architecture for a digital optoelectronic receiver wherein said receiver uses a balanced differential circuit topology.

It is yet a further purpose of the present invention to provide a new and improved architecture for a digital optoelectronic receiver wherein the use of overlapping execution allows for the use of a relatively slow decision circuit.

It is still a further purpose of the present invention to provide a new and improved architecture for a digital optoelectronic receiver which is relatively easy to fabricate and use.

SUMMARY OF THE INVENTION

The above problems and others are at least partially solved and the above purposes and others are realized in a differential charge and dump optoelectronic receiver for baseband digital optoelectronic data links including a preamplifier and a voltage controlled current source defining the tail current of a differential pair that functions as a two quadrant multiplier and using capacitors as loads on the differential pair, making said differential pair an integrator such that the bandwidth of said receiver is automatically optimized, noise immunity is improved, and use of overlapping execution allows for the use of a relatively slow decision circuit.

In a preferred embodiment, one integrator pair is used to recover the data from a Manchester encoded data stream. In another preferred embodiment, two pairs of integrators are used for QPSK like codes.

BRIEF DESCRIPTION OF THE DRAWINGS

Referring to the drawings.

DESCRIPTION OF THE PREFERRED EMBODIMENT

Figure 1:
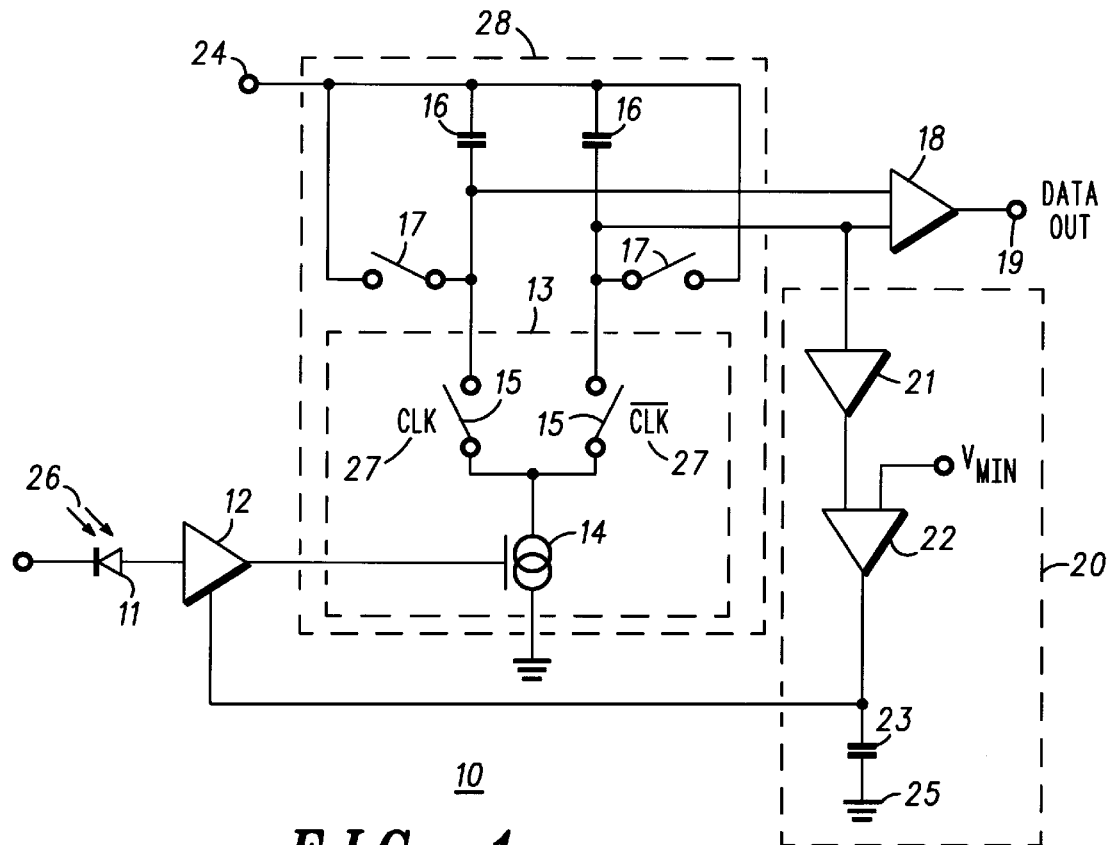
FIG. 1 is a simplified circuit diagram of a differential charge and dump optoelectronic receiver in accordance with the present invention.

Referring specifically to FIG. 1, a simplified diagram of a differential charge and dump optoelectronic receiver 10 in accordance with the present invention is illustrated. Receiver 10 includes a light receiving device 11 such as a photodiode, a preamplifier 12, a two quadrant multiplier 13 having a voltage controlled current source 14 and a differential pair 15, two capacitors 16, two precharge switches 17, a differential amplifier 18 functioning as decision circuit with a data output 19, and a feedback loop 20 having an amplifier 21, a differential amplifier 22, and a capacitor 23. Supply voltage and ground are indicated by symbols 24 and 25, respectively. The advantages of the differential charge and dump optoelectronic receiver 10 will become readily apparent to those skilled in the art from the following detailed description of the operation of said differential charge and dump optoelectronic receiver.

In the differential charge and dump optoelectronic receiver 10 shown in FIG. 1, the optical data signal 26 is converted into an electrical signal by a light receiving device 11 which is connected to the input of preamplifier 12 having an output connected to a voltage controlled current source 14 which defines the tail current of differential pair 15 wherein voltage controlled current source 14 and differential pair 15 constitute a two quadrant multiplier 13. In a fashion familiar from conventional decoders, the multiplier 13 is driven by the clock signal 27. The clock signal 27 is either transmitted along with the data in a parallel system or recovered using a clock recovery circuit in a serial system. The use of capacitors 16 as loads on the differential amplifier 13 makes the differential pair 15 an integrator which in FIG. 1 is designated 28. The integrator 28 needs to be reset at the start of every bit period. The integrating function ensures that the smallest possible bandwidth is used for whatever bit rate circuit 10 is operated at. Furthermore, by the use of overlapping execution, receiver 10 allows for the use of a relatively slow decision circuit 18.

Since the signal arriving at the decision circuit 18 is fully differential, circuit 10 is highly tolerant to extrinsic and intrinsic noise. In order to obtain the maximum dynamic range and frequency insensitivity, a feedback loop 20 can be used to adjust either the swing or average voltage appearing at the output of the integrator. The feedback loop 20 is shown in FIG. 1 as adjusting the gain of preamplifier 12 but this is not required; the same function can be obtained by turning a voltage controlled current source such as 14 into a single quadrant multiplier. Since the feedback loop can tolerate fairly high levels of nonlinearity, there are a number of ways to execute this circuit.

Figure 2:
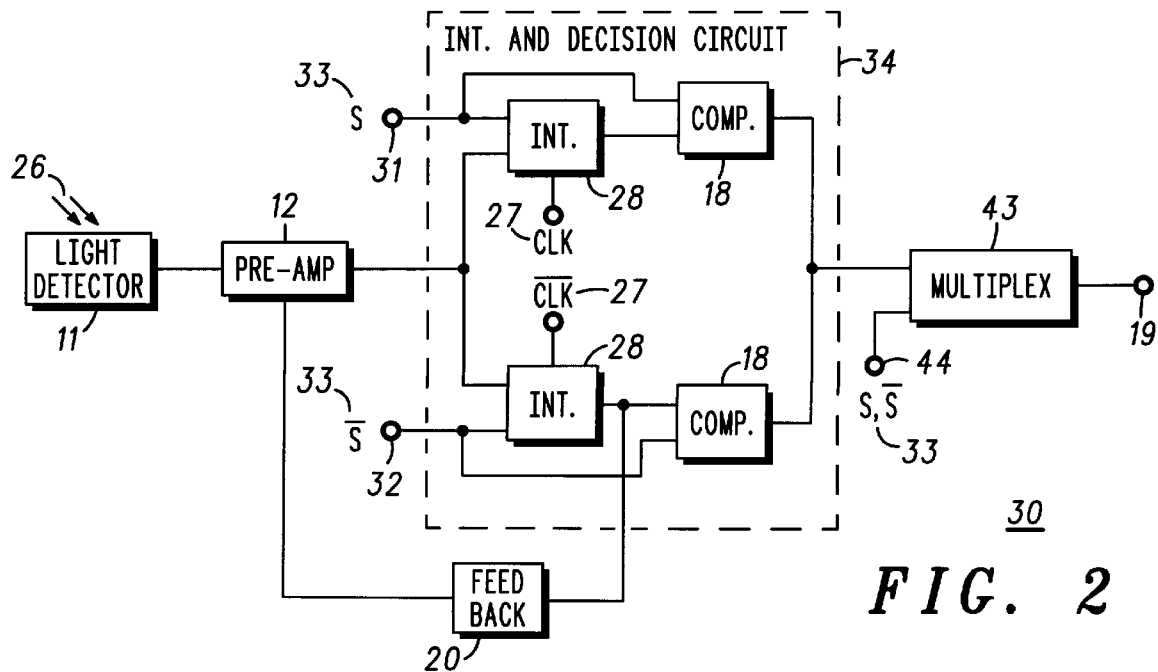
FIG. 2 is a block diagram of a preferred embodiment of the differential charge and dump optoelectronic receiver in accordance with the present invention.

Referring now to FIG. 2, a block diagram of a preferential embodiment of a differential charge and dump optoelectronic receiver 30 according to the present invention is shown. The differential charge and dump optoelectronic receiver 30 includes a light receiving device 11 having an optical input 26 and an electrical output, a preamplifier 12 coupled to the electrical output of the light receiving device 11, an integrator and decision circuit 34 having control inputs 31 and 32 and coupled to the preamplifier 12 and further constructed to alternately integrate signals from the preamplifier 12, a synchronous multiplexer 43 having a control input 44 and coupled to the integrator and decision circuit 34, an electrical output 19, and a feedback loop 20 coupled to the integrator and decision circuit 34 and the preamplifier 12 to obtain the maximum dynamic range and frequency insensitivity. The integrator and decision circuit 34 includes two integrators 28 each connected to a latched comparator 18 which function as decision circuits. The use of two integrators each designated 28 in FIG. 2 is necessitated by the need to reset one integrator 28 at the start of every bit period so that on each clock period, one integrator 28 is integrating the signal and the other integrator 28 is being reset using control signal S which is designated 33 in FIG. 2. In a specific example, differential charge and dump optoelectronic receiver 30 is used to recover the data from a Manchester encoded data stream.

Figure 3:
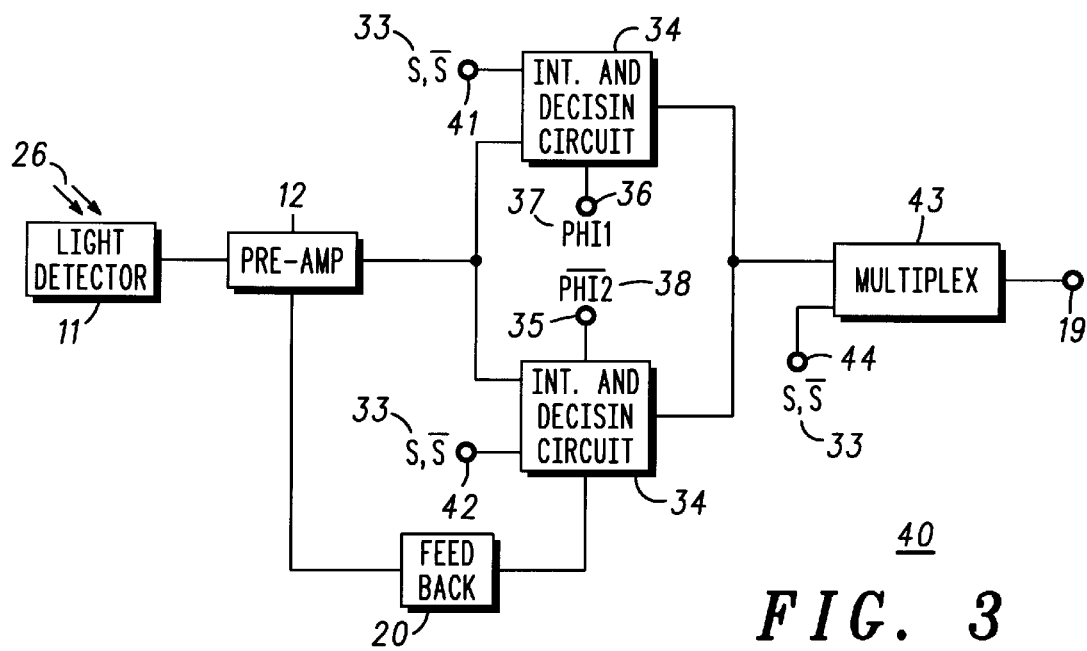
FIG. 3 is a block diagram of another preferred embodiment of the differential charge and dump optoelectronic receiver in accordance with the present invention.

Referring now to FIG. 3, a block diagram of another preferential embodiment of a differential charge and dump optoelectronic receiver 40 according to the present invention is shown. The differential charge and dump optoelectronic receiver 40 includes a light receiving device 11 having an optical input 26 and an electrical output, a preamplifier 12 coupled to the electrical output of the light receiving device 11, two integrator and decision circuits 34 coupled to the preamplifier 12 and having control inputs 41 and 42 and clock inputs 35 and 36, a synchronous multiplexer 43 having a control input 44 and coupled to the pair of integrator and decision circuits 34, an electrical output 19, and a feedback loop 20 coupled to the pair of integrator and decision circuits 34 and the preamplifier 12 to obtain the maximum dynamic range and frequency insensitivity. In a specific example, the differential charge and dump optoelectronic receiver 40 is used to recover the data of QPSK like codes using clock signals phi1 (37) and phi2 (38).

Figure 4:
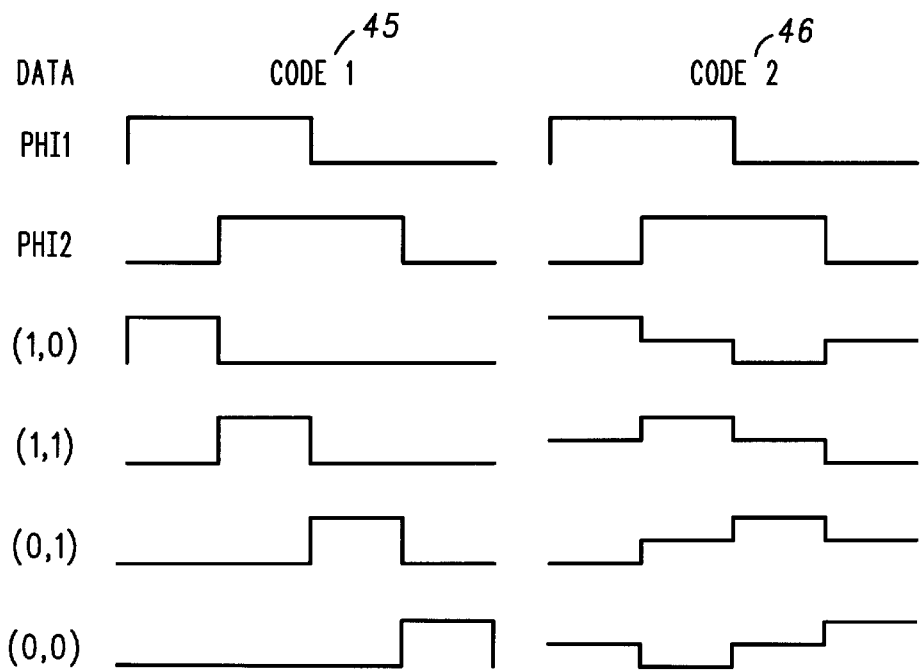
FIG. 4 is a graph illustrating two codes compatible with the differential charge and dump optoelectronic receiver in accordance with the present invention.

Turning now to FIG. 4, two QPSK like codes 45 and 46 which carry two bits per symbol and are recovered using the differential charge and dump optoelectronic receiver 40 in accordance with the invention are illustrated. If the data is presented to the channel as a serial stream, the bit clock will be at twice the speed of phi1 and phi2.

Thus, new and improved receiver architectures for baseband digital optoelectronic data links are disclosed. The differential charge and dump architecture adjusts the bandwidth automatically to the minimum bandwidth required by the data, noise immunity is improved, and use of overlapping execution allows for the use of a relatively slow decision circuit.

While we have shown and described a specific embodiment of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A differential charge and dump optoelectronic receiver comprising:
   a light receiving device having an optical input and an electrical output;
   a preamplifier coupled to the electrical output of the light receiving device;
   an integrator and decision circuit coupled to the preamplifier;
   a synchronous multiplexer coupled to the integrator and decision circuit; and
   a feedback loop coupled to the integrator and decision circuit and the preamplifier to obtain the maximum dynamic range and frequency insensitivity.

2. A differential charge and dump optoelectronic receiver as claimed in claim 1 wherein the integrator and decision circuit includes two integrators and two latched comparators and which is further constructed to alternately process signals from the preamplifier.

3. A differential charge and dump optoelectronic receiver as claimed in claim 2 wherein each integrator includes a two quadrant multiplier having an input connected to the output of the preamplifier and having two output terminals.

4. A differential charge and dump optoelectronic receiver as claimed in claim 3 wherein the two quadrant multiplier includes a voltage controlled current source and a differential pair.

5. A differential charge and dump optoelectronic receiver as claimed in claim 4 wherein the voltage controlled current source is connected to define the tail current of the differential pair.

6. A differential charge and dump optoelectronic receiver as claimed in claim 3 wherein the two quadrant multiplier is driven by the clock signal.

7. A differential charge and dump optoelectronic receiver as claimed in claim 6 wherein the clock signal is provided along with the data in a parallel system or recovered using a clock recovery circuit in a serial system.

8. A differential charge and dump optoelectronic receiver as claimed in claim 2 wherein the output of each integrator is connected to the input of the corresponding latched comparator which functions as a decision circuit.

9. A differential charge and dump optoelectronic receiver as claimed in claim 2 wherein each integrator further includes two capacitors each having a first terminal connected to a different one of the output terminals of the two quadrant multiplier and each having a second terminal connected to a supply voltage.

10. A differential charge and dump optoelectronic receiver as claimed in claim 9 wherein each integrator further includes two precharge switches, one each connected to a different one of the first terminals of said capacitors.

11. A differential charge and dump optoelectronic receiver as claimed in claim 1 including in addition an input for receiving pulses connected to the integration and decision circuit for resetting one of the integrators at the start of every bit period, so that on each clock period, one of the integrators is integrating the signal and the other is being reset.

12. A differential charge and dump optoelectronic receiver as claimed in claim 1 wherein the synchronous multiplexer has an input for receiving pulses to provide synchronous operation with the integration and decision circuit.

13. A differential charge and dump optoelectronic receiver comprising:
   a light receiving device having an optical input and an electrical output;
   a preamplifier having an input connected to the output of the light receiving device and having an output;
   a two quadrant multiplier having an input connected to the output of the preamplifier and having two output terminals;
   two capacitors having each a first terminal connected to the respective output terminal of the two quadrant multiplier and having each a second terminal connected to the supply voltage;
   two precharge switches connected to the respective opposite terminals of said capacitors;
   a differential amplifier functioning as a decision circuit having two input terminals connected to the respective output terminals of the two quadrant multiplier and having a data output; and
   a feedback loop coupled between the two quadrant multiplier and the preamplifier to obtain the maximum dynamic range and frequency insensitivity.

14. A differential charge and dump optoelectronic receiver as claimed in claim 13 wherein the two quadrant multiplier comprises a voltage controlled current source and a differential pair.

15. A differential charge and dump optoelectronic receiver as claimed in claim 14 wherein the voltage controlled current source defines the tail current of the differential pair.

16. A differential charge and dump optoelectronic receiver as claimed in claim 13 wherein said capacitors are loads on the differential pair so as to cooperate with the differential pair to define an integrator providing an integration function.

17. A differential charge and dump optoelectronic receiver as claimed in claim 13 wherein the two quadrant multiplier is driven by the clock signal.

18. A differential charge and dump optoelectronic receiver as claimed in claim 13 wherein the clock signal is provided along with the data in a parallel system or recovered using a clock recovery circuit in a serial system.

19. A method of differentially charging and dumping signals in an optoelectronic receiver comprising the steps of:
   receiving an optical signal and converting the received optical signal into an electrical output;
   amplifying the electrical output to provide amplified signals;
   alternately integrating the amplified signals and supplying a differential pair of output integrated signals;
   differentially amplifying the differential pair of output integrated signals to provide a data output; and
   feeding back at least one of the differential pair of output integrated signals to control the step of amplifying the electrical output to obtain a maximum dynamic range and frequency insensitivity.

20. A method of differentially charging and dumping signals in an optoelectronic receiver as claimed in claim 19 wherein the steps of alternately integrating the amplified signals, differentially amplifying, and feeding back at least one of the differential pair of output integrated signals are performed so as to utilize the smallest possible bandwidth for a bit rate at which the receiver is operating.

21. A method of differentially charging and dumping signals in an optoelectronic receiver as claimed in claim 19 wherein the steps of alternately integrating the amplified signals, differentially amplifying, and feeding back at least one of the differential pair of output integrated signals are performed so as to implement an overlapping execution architecture which allows for the use of relatively slow decision circuits.

22. A method of differentially charging and dumping signals in an optoelectronic receiver as claimed in claim 19 wherein the steps of alternately integrating the amplified signals, differentially amplifying, and feeding back at least one of the differential pair of output integrated signals are performed so as to be highly tolerant to extrinsic and intrinsic noise.

23. A method of differentially charging and dumping signals in an optoelectronic receiver as claimed in claim 19 wherein the step of feeding back at least one of the differential pair of output integrated signals is performed so as to adjust either the swing or average voltage appearing at the output of the integrator.

24. A method of differentially charging and dumping signals in an optoelectronic receiver as claimed in claim 19 wherein the step of feeding back at least one of the differential pair of output integrated signals includes adjusting amplifying gain in the step of amplifying the electrical output.

25. A method of differentially charging and dumping signals in an optoelectronic receiver as claimed in claim 19 wherein the step of amplifying the electrical signal includes amplifying a QPSK-like code and the step of alternately integrating the amplified signals includes recovering the QPSK-like code.

26. A method of differentially charging and dumping signals in an optoelectronic receiver as claimed in claim 19 wherein the step of amplifying the electrical signal includes amplifying a Manchester code and the step of alternately integrating the amplified signals includes recovering the data from a Manchester encoded data stream.

* * * * *